United States Patent

Owens et al.

[15] 3,661,647
[45] May 9, 1972

[54] SOLID STATE ELECTRIC CELL HAVING STABILIZED RESISTANCE

[72] Inventors: Boone B. Owens, Calabasas, Calif.; James R. Humphrey, Albany, Oreg.

[73] Assignee: Gould Ionics, Inc.

[22] Filed: Aug. 31, 1970

[21] Appl. No.: 68,359

[52] U.S. Cl. .............................................. 136/83 R, 136/153
[51] Int. Cl. ................................ H01m 11/00, H01m 13/00
[58] Field of Search ..................... 136/6, 83, 153, 137, 100; 23/89, 100, 367; 252/518

[56] References Cited

UNITED STATES PATENTS

| | | | |
|---|---|---|---|
| 2,718,539 | 9/1955 | Bradshaw et al. | 136/83 R |
| 3,443,997 | 5/1969 | Argue et al. | 136/83 R |
| 3,476,605 | 11/1969 | Owens | 136/83 R |
| 3,503,810 | 3/1970 | Groce | 136/120 |

*Primary Examiner*—Anthony Skapars
*Attorney*—Sokolski & Wohlgemuth

[57] ABSTRACT

A solid state electric cell having a mobile oxidant such as iodine in the cathode, a solid state electrolyte and a suitable anode containing a material which is capable of reducing the mobile oxidant. The electrolyte contains dispersed therein a material capable of reacting with the mobile oxidant preventing it from reaching the anode. For example, silver can be dispersed in the electrolyte of the cell containing mobile iodine in the cathode such that AgI will be formed dispersed throughout the electrolyte during storage.

11 Claims, 4 Drawing Figures

Patented May 9, 1972

3,661,647

INVENTORS
BOONE B. OWENS
JAMES R. HUMPHREY
BY
SOKOLSKI & WOHLGEMUTH

ATTORNEYS

3,661,647

SOLID STATE ELECTRIC CELL HAVING STABILIZED RESISTANCE

BACKGROUND OF THE INVENTION

The herein invention relates to solid state electric cells having improved shelf life through the prevention of resistance build-up in the cell. More particularly, the invention relates to solid state electric cells having mobile oxidants and a method and means for preventing the oxidant from reaching and reacting with the anode composition to cause a high resistance layer to be formed on the anode.

Solid state electrochemical devices, particularly solid state electric cells, as well as batteries, are known in the art as shown in U.S. Pat. Nos. 2,718,539 and Re.24,408. These solid state cells are of particular interest since they are lightweight, have a long shelf life, no electrolyte leakage and susceptibility to miniaturization.

Recently, solid conductive compositions of matter having unusually high ionic conductivity have been described and claimed. For example, in U.S. Pat. 3,443,997 there is disclosed a solid electrolyte element having the formula $MAg_4I_5$ where M represents K, Rb, $NH_4$ or Cs and combinations thereof, Cs being present only as a minor constituent of M. Typical examples of these highly conductive electrolytes would include $RbAg_4I_5$, $KAg_3I_4$ and the like. In U.S. Pat. No. 3,476,606, there is disclosed an ionically conductive solid state electrolyte composition which is an organic ammonium silver iodide salt which has a preferred composition range of from $QAg_4I_5$ (QI·4AgI) to $QAg_9I_{10}$ (QI·9AgI) where Q is an organic ammonium cation preferably a quaternary ammonium cation. A typical electrolyte composition formed within this range is $[N(CH_3)_4]_2Ag_{13}I_{15}$.

The cathode in the electric cell consists generally of a nonmetal capable of functioning as a electron acceptor, such materials being capable of reduction by any of the electron donors which are used as anodes. Several such cathode materials are disclosed in U.S. Pat. No. Re.24,408. Because of its relatively low volatility however, iodine in elemental form or preferably as part of an organic or inorganic complex is favored as a cathode material. Particularly preferred as a source of iodine are organic ammonium polyiodides of the type disclosed in U.S. Pat. No. 3,476,605. These preferred polyiodide compositions thus have a preferred general formula $QI_n$ where Q is an organic ammonium cation preferably a quaternary ammonium cation and N has a value range from 2 to 11. (Typical of such material is tetramethylammonium pentaiodide, $N(CH_3)_4I_5$). It is generally preferred that both the cathode and the anode of the cell are of a composite structure and contain dispersed solid electrolyte material therein together with carbon. Thus a typical cathode will comprise 2 to 80 weight percent polyiodide, 5 to 60 weight percent carbon, and 10 to 50 weight percent electrolyte.

Typical anodes in the past comprised a metal such as silver. Preferred, however, is a type of composite anode disclosed in U.S. Pat. No. 3,503,810 which has finely divided silver metal powder in a matrix of carbon and electrolyte.

In the aforegoing electric cells, the electrolyte and cathode are pressed powder pellets. The anode can be plain silver foil, though when it is preferably a mixture of silver, electrolyte and carbon it also is in pressed pellet form. One of the particular advantages of the preferred electrolytes disclosed above is their extremely high conductivity. Once the resistance of the electrolyte material increases significantly, the advantage of the material is lost since the discharge voltage would be too low for most applications. With such increased resistance there then is considerably less useful energy during the time of discharge. It has been found that in the foregoing electric cell system there has been a tendency for the resistance to increase during unattended storage. Further, with an increase in storage temperature the rate of resistance increase has gone up.

SUMMARY OF THE INVENTION

The principle object of this invention is to provide solid state electric cell which does not experience a resistance build-up with storage time.

In accordance with the present invention it has been discovered that resistance build-up results in solid state electric cells from the diffusion of a mobile oxidant such as iodine diffusing through the solid state electrolyte to the anode where the oxidant reacts with a reductant present in the anode to form a resulting highly resistant layer on the anode surface. The herein invention is directed to a resulting cell wherein the mobile oxidant such as the iodine is prevented from reaching the surface of the anode to react with the reductant such as Ag present therein to form the highly resistive layer on the anode surface adjacent the electrolyte. The present invention thus comprises disposing a material in the electrolyte which will tie up the mobile oxidant through a reaction with it or complexing it to prevent it from reaching the surface of the anode. For example, when silver is dispersed throughout the solid electrolyte, silver iodide then results from the diffusion of the iodine through the electrolyte where it encounters the silver particles. Thus the iodine is prevented from reaching the anode surface to form a highly resistive AgI layer thereon. There are additional various materials that can be added to the electrolyte to accomplish the aforegoing desired result of tying up the mobile oxidant before it reaches the anode. Through the use of a material added to the electrolyte to tie up the mobile oxidant, it has been found that the resulting solid state electric cell will experience little or no increase in resistance over long periods of storage.

DESCRIPTION OF THE PREFERRED EMBODIMENTS

The herein invention is directed to solving a problem that exists in solid state electrochemical devices. In a simplified form, the typical electrochemical cell wherein the herein problem exists is comprised of an anode which consists of any suitable material that functions as an electron donor. The most typical material used is silver which can be in the form of a thin sheet or foil or powder. Copper and other suitable materials can also be utilized. The preferred form as disclosed in U.S. Pat. No. 3,503,810 is an anode formed of a mixture of finely divided silver powder in a matrix of carbon and a solid electrolyte.

The herein invention is particularly directed to solid state electrochemical devices wherein the solid electrolyte element utilized has unusually high ionic conductivity. Examples of such electrolytes are disclosed in U.S. Pat. No. 3,443,997 wherein the electrolyte has a general formula $MAg_4I_5$ where M represents K, Rb, $NH_4$, or Cs. Another example of a particular preferred type of highly conductive electrolyte is disclosed in U.S. Pat. No. 3,476,606 wherein the electrolyte has the formula $QAg_nI_{N+1}$ where n can vary from 3 to 39 and Q is an organic ammonium cation. The herein invention is particularly directed to the foregoing types of electrolytes and other electrolytes which possess unusually high conductivity since the increase of resistance with storage would inherently obviate the advantage of the utilization of these particular electrolytes making them impractical. For example, the particular advantage of the herein invention is thus not as apparent when the solid electrolyte is composed of low conductivity material such as silver iodide and similar types of material.

The cathode of a particular device of this invention will consist generally of a non-metal capable of functioning as an electron acceptor, such materials being capable of reduction by any of the electron donors which are used as anodes. Several suitable cathode materials are shown in U.S. Pat. No. Re.24,408. Because, however, of its relatively high reactivity, iodine is a kinetically favored cathode material. Many of the cathode materials, particularly those including iodine, have a mobile oxidant. The iodine can move through the electrolyte composition where it can then strike the surface of the anode reacting with the reductant therein to form a resistive material which will coat the anode increasing the resistivity of the cell. For example, iodine can migrate through the solid electrolyte to form AgI as a coating on the silver containing anode. The AgI is highly resistive as compared to the electrolyte and will noticeably raise the resistance of the cell and severely effect polarization. Other typical mobile oxidants than iodine which can similarly traverse the electrolyte in the cells would include for example, bromine, chlorine, sulfur, or other oxidant materials with finite vapor pressures.

Figure 1:
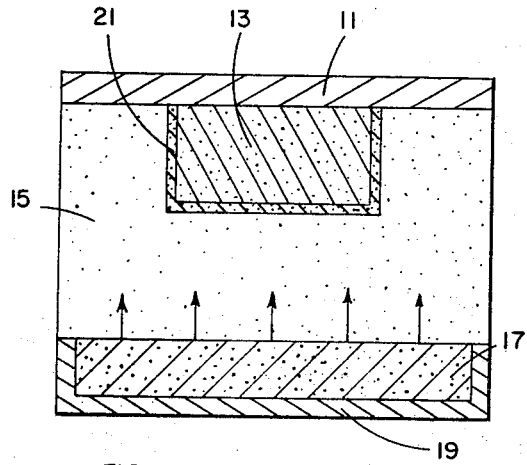
FIG. 1 is a cross sectional view of an electric cell wherein a resistive layer has been formed upon storage covering the anode.

The above described phenomenon is shown schematically in FIG. 1 wherein a cross sectional view of a cell having a resistive coating on the anode is shown. In the cell of FIG. 1 there is seen an electronically conducting layer 11 such as silver in contact with a mixed anode layer 13, for example, electrolyte containing dispersed therein silver and carbon. An electrolyte layer 15 can be formed of the preferred abovementioned highly conductive ionic materials. A cathode can consist of a layer 17 of an electron acceptor material such as polyiodide plus carbon containing electrolyte material dispersed therein. In the preferred construction, the cathode 17 is disposed in a cup of a metal conductor. The cup 19 consists of a suitable electronically conductive material nonreactive with the cathode material such as Hastelloy, tantalum, molybdenum, niobium and the like. As shown in FIG. 1, the iodine, for example, contained in layer 17 will migrate as shown by the arrows through the electrolyte toward the anode 13 where it will react with the silver therein to form a continuous layer 21 of silver iodide AgI on the anode adjacent the electrolyte.

The rate of diffusion of the iodine, for example, is related to its partial pressure. The higher the partial pressure the greater the rate of diffusion through the electrolyte. This can be appreciated, because at the anode 13 the partial pressure of the iodine is always zero since it will be in the form of AgI. As a result the iodine will always diffuse through the electrolyte to the anode because of this pressure differential or gradient.

As described in the aforementioned patents relating to the electrolyte composition, it is preferably formed as a pressed powder made up of crystals of the highly conductive single phase solid compounds. The compact electrolyte has a finite permeability to iodine or other similar mobile oxidants. Since it is believed that the iodine does not permeate a single crystal but travels along grain boundaries, cracks, crevices, and the like. As a result, if a perfect single crystal electrolyte were used, the problem of diffusion of the mobile oxidant could be essentially eliminated. However, when several crystals are compacted to form the electrolyte, the described problem will exist. A further way of at least minimizing the herein problem is to minimize the diffusion path through the electrolyte. This can be accomplished by better packing of the electrolyte crystals when forming the compacted powder. This, for example, might be achieved by utilizing different size electrolyte grains such as a bi-modal or tri-modal blending of electrolyte crystals.

Figure 2:
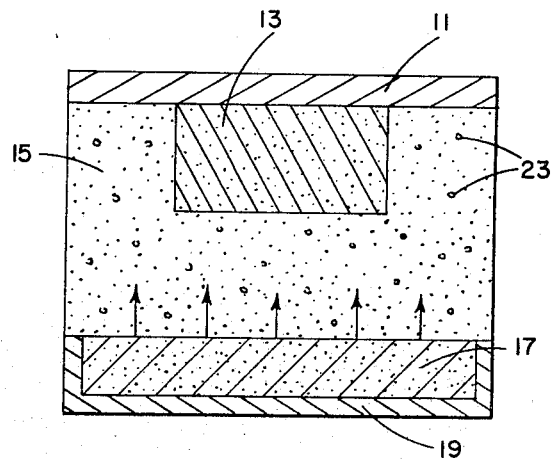
FIG. 2 is a cross sectional view of a first embodiment of a cell of this invention having a means for preventing the mobile oxidant from reaching the anode surface.

The herein invention is particularly directed to preventing the build-up of the highly conductive layer 21 on the anode surface. This can be accomplished by adding a particulate material to the electrolyte composition which will react with and tie up the mobile oxidant before it reaches the anode. Such an additive material will hereinafter be referred to as a "getter." As shown in the enlarged view of FIG. 2, particles 23 of the getter are dispersed throughout the electrolyte 15. A typical example of a suitable getter is silver powder. The mobile oxidant such as iodine will thus encounter the dispersed silver in the electrolyte and form AgI dispersed throughout the electrolyte leaving a conductive path therethrough to the anode preventing the continuous layer 21 on the anode surface from forming.

In selecting the getter material, several criteria should be considered, that is, it should have a high gettering for the mobile oxidant per unit volume. For example, silver will react with iodine to form AgI, typing up one iodine whereas Te will form the compound $TeI_4$ thus tying up four iodines. Additionally, the ionic conductivity of the getter product should be as high as possible. Whereas, for example, the Te has a higher gettering per unit volume than Ag, the resulting product AgI has a much better conductivity than the $TeI_4$. Further, the getter material should have as high affinity for the mobile oxidant as possible so as to tie up and not readily release the material. Finally, the getter material should be chemically and physically compatible with the electrolyte in which it is dispersed.

The particular getter material to be added to the electrolyte will, of course, be determined based upon the aforegoing factors as well as the particular cell requiring the addition. Simple trial and error experimentation can readily lead one to determine the most suitable material to be used in a given cell. Examples of the getters include those materials which serve as reductants for the mobile oxidant which include but are not limited to Ag, Cu, Te, $Ag_2S$, and $Cu_2S$ sulfide ions and other chalcogenide ions. Additionally, various halide salts, capable of polyhalogen formation, can be used as getters in the herein invention. Such iodine complexing agents can include for example, iodide salts such as $(CH_3)_4NI$, $(C_4H_9)_4NI$, $(CH_3)_3SI$ and various other organic onium halides for example as shown in U.S. Pat. No. 3,057,760. Additionally, charge transfer complexes can be used as polyhalogen complex formers. Examples of the latter materials are the hexamethylenetetramine quaternary salts of halogenated allyl halides as disclosed in U.S. Pat. No. 3,244,710.

Typical of further charge transfer complexes that can be used are those of the type disclosed in an article entitled Solid-State Electrochemical Cells Based on Charge Transfer Complexes, J. Electrochem. Soc.: Electrochemical Science, April 1967, pages 323–329 by Gutmann et al.

The getter material could also be combined with a polymer as a pendant group on the polymer. The polymer can then be mixed into the composition. The polymer would then serve a dual function of being both the getter due to the pendant group and serving to flow between and fill the cracks or crevices in the powdered matrix. For example, it is generally preferred to utilize a polymer material such as polycarbonate resin or a polymethylmethacrylate in the electrolyte matrix to aid in processing regardless of the presence of a getter.

One method for disposing silver in the electrolyte is related to that disclosed in U.S. Pat. No. 3,503,810 wherein the method of forming an anode is disclosed. The same technique can be applied to disposing the silver in the electrolyte by blending a silver compound decomposable into silver metal and a gaseous reaction product into the electrolyte composition and heating the mixture at an elevated temperature sufficient to reduce the silver compound. For example $Ag_2C_2O_4$ can be mixed with the electrolyte and upon heating $CO_2$ is driven off leaving Ag dispersed in the electrolyte. Of course, Ag powder alone can be added to the electrolyte in the same manner as the various other powders are added and then pressed into the desired pellet that comprises the electrolyte portion of the cell.

As indicated, the purpose of the addition of the getter to the electrolyte composition is to prevent the migration of the mobile oxidant, such as iodine, to the surface of the anode. Thus, there should be a sufficient amount of the getter material in the electrolyte to react with the mobile oxidant over the projected life of the cell such that the oxidant never reaches the anode surface. Obviously, the amount of getter will vary depending upon the construction of a given cell and the composition thereof. The amount of the getter can then be determined by simple trial and error type experimentation where several test cells can be formulated having differing amounts of getter material in the electrolyte. The cells can then be tested for the projected life of the cell. The cells are stored at varying temperatures and periodically tested for resistance. For example, a cell might have a requirement of a storage life of 1 year. The cells can then be cut open and through the utilization of a microscope or other means the progression of the oxidant can be visually observed to determine the distance that it has diffused into the electrolyte from the cathode.

Generally, of course, it is desirable to minimize the amount of electrolyte composition present in the cell in order to achieve a maximum energy density. In view of this, it is then desirable to utilize as little getter material as possible to prevent the mobile oxidant from reaching the anode. For example, if the lifetime of the cell is expected to be 1 year then the amount of getter added to the electrolyte should be that which would allow the oxidant to reach the surface of the anode in exactly 1 year. More than this amount of getter would be an excess of that required and would, of course, necessitate an increase in the total electrolyte thickness in the cell, or increased concentration of getter.

Figure 3:
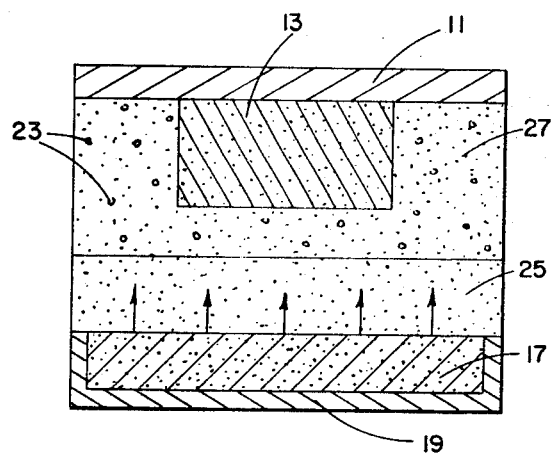
FIG. 3 is a cross sectional view of a second embodiment of a cell of this invention having a means for preventing the mobile oxidant from reaching the anode surface.
Figure 4:
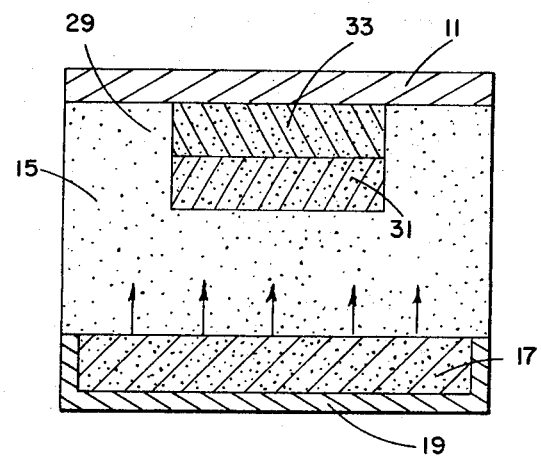
FIG. 4 is a cross sectional view of a third embodiment of a cell of this invention having a means for preventing the mobile oxidant from reaching the anode surface.

A high density of the getter material adjacent the cathode surface will have a tendency to cause a migration of the mobile oxidant out of the cathode and could tend to somewhat increase the diffusion rate from the cathode. Since it is desirable to maintain the oxidant in the cathode, in the preferred embodiment of this invention, there would be no getter material in the electrolyte in the area adjacent the cathode. This can be achieved by a graded electrolyte wherein the density of the getter material in the electrolyte increases with distance from the cathode. However, utilizing powder metallurgical techniques in pressing the electrolyte, this is often difficult to achieve. As shown in FIG. 3, a more practical approach is to form the electrolyte out of two or more pellets having differing densities of the getter material in the electrolyte. For example, the electrolyte can be divided into two segments with one segment 25 having no getter material therein for placement adjacent the cathode. The other segment 27 will contain the getter material 23 equally dispersed therein and placed between the first segment 25 and the anode 13. The same effect can be achieved as seen in FIG. 4 by using a two-layered anode 29 where a separate protective layer 31 of modified anode composition is disposed between the operating anode and the electrolyte. In this instance, the relative amount of electrolyte is increased in the anode composition with a corresponding decrease in the amount of reductant and carbon, if present. This ultimate effect to be achieved, is once again to disperse the reaction product of the oxidant and reductant throughout electrolyte and thus prevent the buildup of a continuous layer of the product on the surface of the operating anode. It should be apparent that the composition of this protective anode layer 31 will have essentially the same composition of electrolyte which contains the getter material. It is referred to as an anode layer when the composition additionally contains carbon as does the a preferred operating anode, as previously described.

The following examples illustrate the practice of this invention but are not intended as limitations thereof. In the examples the anode element is prepared in accord with the method described in U.S. Pat. No. 3,503,810 while the cathode is prepared in accord with a method described in U.S. Pat. No. 3,476,605. In view of this the examples will contain the compositions of the anode and cathode but not the method of making same.

EXAMPLE 1

Preparation of Reference Cell

A reference cell not incorporating the concept of the herein invention was prepared having an anode comprised in weight percent, 53% silver, 42% $RbAg_4I_5$ and 5% carbon. The anode as well as the cell had a diameter of about one-half inch and a thickness of 20 mil. The electrolyte layer was comprised in weight percent, 90% $RbAg_4I_5$ and 10% of a thermoplastic polycarbonate resin produced from the reaction of bisphenol A phosgene. The electrolyte pellet was formed by mixing the resin with the $RbAg_4I_5$ and pressing the mixed powder at a load of 1,000 lb. to achieve the pellet. The resin served as a filler which aids in the processing and to occupy some of the area of the cracks and crevices between the grain boundaries of the $RbAg_4I_5$. The cathode is comprised, in weight percent, of 77% $(CH_3)_4NI_9$, 10% carbon and 13% $RbAg_4I_5$. The assembly was then pelletized at 10,000 lbs. and encapsulated in an epoxy type resin to give both a cell of rugged construction and one that is protected from atmospheric corrosion. The cell construction is essentially that shown in FIG. 1. When a cell of the above composition and construction was tested at 70° F., it was found to have an initial resistance of 5.4 ohms; after 1 year had elapsed at the foregoing temperature the resistance of the cell increased to 8.7 ohms. At 160° F. a cell of the aforegoing construction had an initial resistance of 4.4 ohms which increased to 10.9 ohms at the end of 1 year.

EXAMPLE 2

Solid State Electric Cell Containing Ag Dispersed in Electrolyte

Cells were made identical to that described in Example 1 having the same dimensions utilized in the same anode and cathode compositions. The electrolyte layer however contained 5 weight percent of silver dispersed therein. The silver was introduced by blending the electrolyte powder of Example 1 with the appropriate amount of silver oxalate, and then heating the mixture to 165° C. for 15 minutes to decompose the silver oxalate. The final composition contained 5% silver, 9.5% resin, and 85.5% $RbAg_4I_5$. Test cells were then built by the same techniques as used in Example 1. At 70° F. a cell made in accord with this example had an initial resistance of 39.6 ohms. After 1 year the resistance decreased to 38.5 ohms. More dramatic results achieved at an elevated temperature of 160° F. for the initial resistance of a cell having the composition of the example was 26 ohms. After 1 year the resistance had decreased to 9.7 ohms. The initially high resistance of these cells was due to partial disproportionation of the electrolyte $RbAg_4I_5$ into $AgI$ and $Rb_2AgI_3$. These resistive salts caused the observed high resistance, and although there is some reduction in cell voltage during discharge, it was found that when resistive materials are dispersed in the electrolyte they do not severely degrade cell performance. If the resistive material is formed only on the anode surface then severe polarization results during low temperature discharge. It has been found that the silver can be introduced into the electrolyte without obtaining this initial high resistance by using powdered silver, or annealing the resistive material or keeping the reactants cooler during the pyrolysis step. The resistance of the cells stored at 160° F. decreased to 9.7 ohms because the resistive salts were recombining to form $RbAg_4I_5$.

Example 3

Solid-State Electric Cell Having Separate Layer of Electrolyte Containing Dispersed Ag Adjacent Anode In this example a graded electrolyte was utilized comprised of two separate pellets, the first pellet comprising anode alone while the second pellet comprised silver dispersed in electrolyte adjacent to the anode. In the cells made in accordance with this example the anode and cathode were of the same composition and made in the same way as described in Example 1. The cell and components had the same dimensions also as that set forth in Example 1. The difference however in this cell resides in the structure and composition of the electrolyte between the cathode and normal anode. The first pellet was formed of the electrolyte composition which was the same as that set forth in Example 1. This pellet had a thickness of 12 mils. A second pellet of 11 mils thickness was formed and disposed between the electrolyte pellet and the anode. The second pellet contained 74 weight percent $RbAg_4I_5$ and 26 weight percent of silver dispersed therein and did not contain any resin. The initial resistance of the cell of this example at 70° F. was 6.6 ohms. After 1 year the resistance slightly increased to 7.6 ohms. The initial resistance of a cell made in accord with this example at 160° F. was 4.8 ohms. After 1 year the resistance had increased to 6.4 ohms.

We claim:

1. In a solid state electric cell having a cathode containing a mobile oxidant, an anode containing a reductant for said oxidant and a solid electrolyte disposed therebetween in cooperative relation, the improvement which comprises:
   means for preventing said mobile oxidant from reaching said anode and reacting with the reductant present therein; said means comprising a material disposed between said cathode and anode which reacts with said mobile oxidant before it reaches said anode.

2. The cell of claim 1 wherein:
   said material capable of reacting with said oxidant is dispersed in said electrolyte.

3. The cell of claim 2 wherein the amount of said material capable of reacting with said oxidant is greater adjacent said anode than adjacent said cathode.

4. The cell of claim 3 wherein said electrolyte has two discrete layers, with a first layer adjacent said cathode containing no material capable of reacting with the mobile oxidant and a second layer disposed between said first layer and said anode containing said material capable of reacting with the oxidant.

5. The cell of claim 1 wherein said material capable of reacting with said oxidant is selected from the group consisting of reductants for the oxidant and materials which will form complexes with the oxidant.

6. The cell of claim 1 wherein the mobile oxidant is iodine.

7. The cell of claim 6 wherein said material capable of reacting with iodine is selected from the group consisting of reductants for iodine, iodide complexes, and charge transfer complexes capable of reacting with the iodine.

8. The cell of claim 7 wherein said reductant is silver, said silver being present in an amount insufficient to provide an electronic path through said electrolyte.

9. The cell of claim 8 wherein said silver is in particulate form dispersed throughout said electrolyte.

10. The cell of claim 8 wherein there is greater concentration of silver adjacent the anode than adjacent the cathode.

11. The cell of claim 1 in which the electrolyte element comprises an ionically conductive composition of matter wherein the conductivity imparting component has the formula $MAg_4I_5$ where M is selected from the group consisting of K, Rb, $NH_4$, Cs and combinations thereof and $QAg_nI_{n+1}$; $n$ varying from 3 to 39 and Q being an organic ammonium iodide cation.

* * * * *